March 4, 1924.  
H. H. GEIGLEIN  
GAS TANK FOR AUTOMOBILES  
Filed Sept. 6, 1921
1,485,975
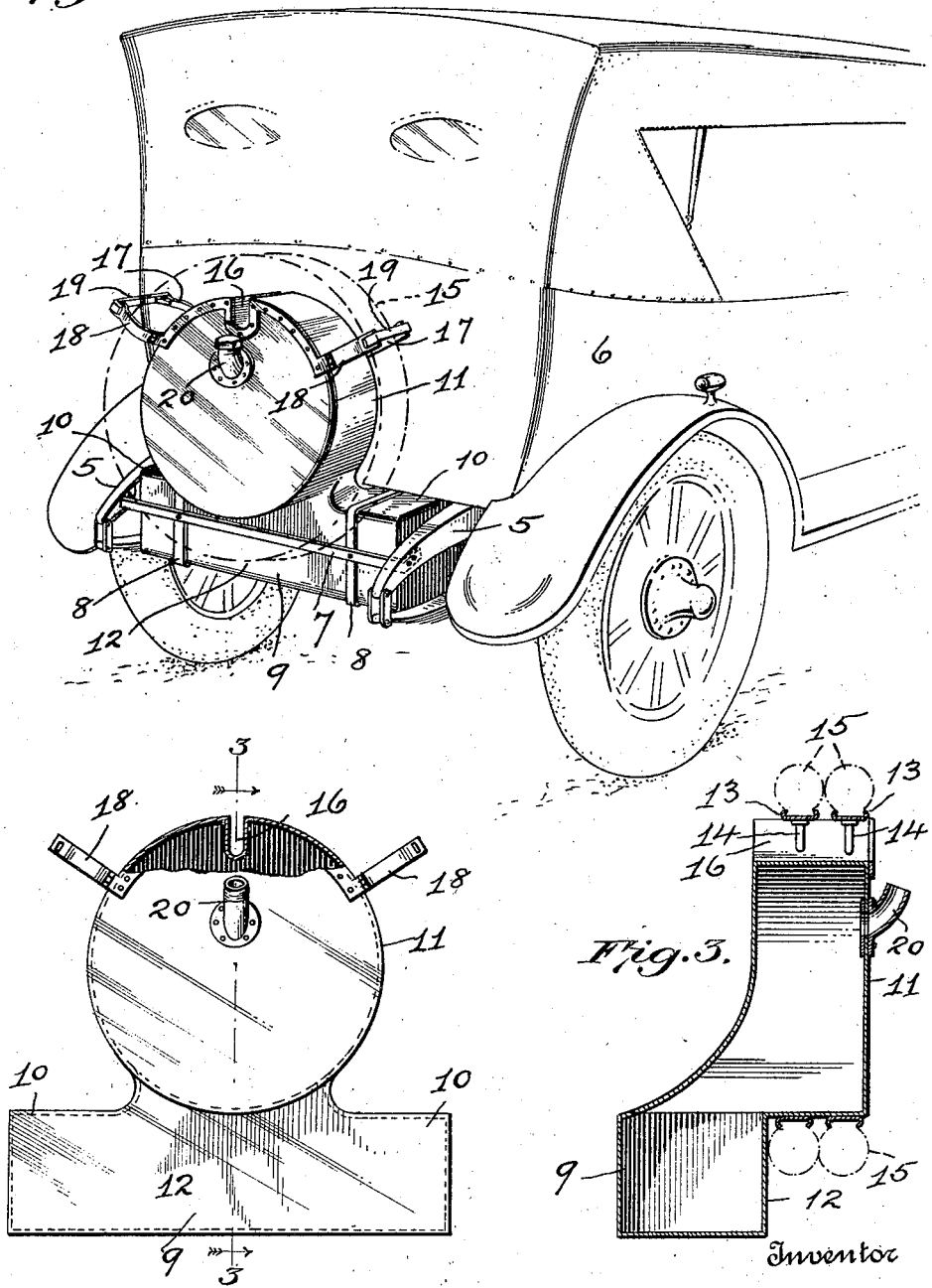

Patented Mar. 4, 1924.

1,485,975

UNITED STATES PATENT OFFICE.

HENRY H. GEIGLEIN, OF BALTIMORE, MARYLAND.

GAS TANK FOR AUTOMOBILES.

Application filed September 6, 1921. Serial No. 498,671.

*To all whom it may concern:*

Be it known that HENRY H. GEIGLEIN, a citizen of the United States, residing at Baltimore, in the State of Maryland, has invented certain new and useful Improvements in Gas Tanks for Automobiles, of which the following is a specification.

This invention relates to improvements in gas tanks for automobiles and has for its objects to provide a tank of greater capacity; and to also construct the same so that it may serve as a spare tire carrier.

The invention is illustrated in the accompanying drawing, wherein,—

Fig. 1 shows a rear perspective view of an automobile with the improved tank and tire carrier thereon.

Fig. 2 illustrates the detached tank in rear elevation,—the upper portion thereof being broken away to show a portion of the interior, and Fig. 3 shows the tank in vertical section,—the section being taken on the line 3—3 of Fig. 2.

In the drawing the numeral 5, designates the two side bars of the chassis or frame on which the body 6, is carried.

The particular means for sustaining the tank is entirely immaterial to the invention, but in the present instance, there is provided a horizontal cross-bar 7 that extends between and is carried by the rear projecting ends of the frame and suitable straps or bands 8 are secured to this cross-bar and embrace a portion of the tank and may also be suitably secured to the body.

The tank in the present instance has a lower portion 9 of a generally rectangular shape at its opposite ends 10, and is of a length to extend substantially from one side bar 5 to the other, more or less.

Above the lower rectangular portion the tank has a circular portion as at 11, and this circular portion projects upwardly and also rearwardly with respect to and overhangs the rear vertical wall 12, of the lower rectangular portion, as best shown in Fig. 3 of the drawing.

This circular portion 11 of the tank has an exterior diameter to snugly fit the interior of the tire-rims 13, so that said rims will fit fairly close about the said circular portion.

In order to provide for the valve stems 14, of the tires 15, which stems usually project inwardly from the inner circumference of the rim 13, I provide the circular portion of the tank with a cross-wise circumferential recess 16, into which the stems 14, may project when the mounted tires are placed on the said circular portion 11.

To retain the mounted tires on the circular portion of the tank, I provide a plurality of arms 17; a plurality of pivoted arms 18, at the rear face of the circular portion 11 and cross-bars 19 which connect the said arms 17 and 18 and extend over the outer circumference or tread of the tires as indicated by the circular broken lines 15, in Fig. 1.

By providing a gas tank with the circular overhanging portion as described, I materially increase the capacity of the tank and also utilize the circular portion as a tire-carrier which is a part of and rigid with the car and I avoid the necessity of providing an extra attachment to carry the tires and its accompanying difficulties and troubles.

A filling nozzle 20, is provided in the rear vertical wall of the circular portion 11 of the tank for obvious purposes.

Having described my invention, I claim,

1. A gas tank for motor vehicles having a lower elongated portion and a circular portion extending upwardly from the elongated portion,—the interiors of said two portions being in communication and said circular portion being of a diameter to be encircled by a tire rim, and means for holding said rim in place on said circular portion.

2. A gas tank for motor vehicles having a lower elongated portion and a circular portion extending upwardly from the said lower elongated portion and extending rearwardly from the said lower portion to overhang the latter said elongated and circular portions of the tank having their interiors in communication and pivoted arms attached to the upper part of the circular portion to swing over and engage spare tires that are mounted on said circular portion.

In testimony whereof I affix my signature.

HENRY H. GEIGLEIN.